Feb. 1, 1955

C. V. JOHNSON 2,700,940

APPARATUS FOR PREPARING MOLDABLE MATERIALS
AND PRODUCING PELLETS

Filed April 2, 1948

INVENTOR.
CLYDE V. JOHNSON,
BY
Hazard & Miller
ATTORNEYS.

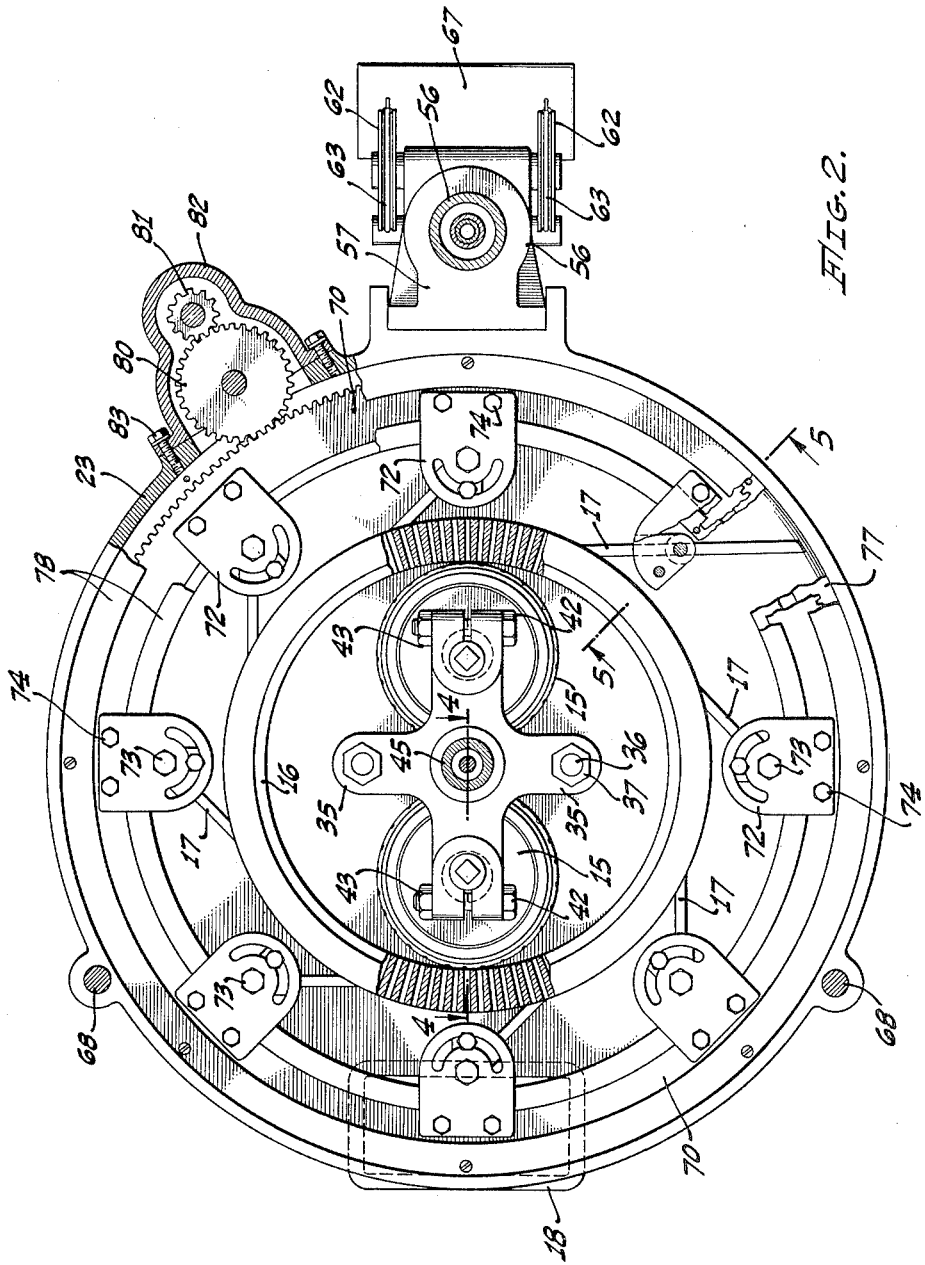

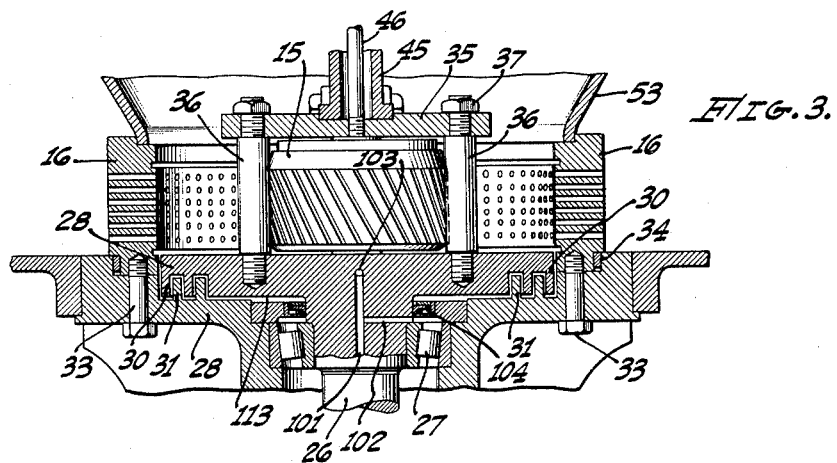
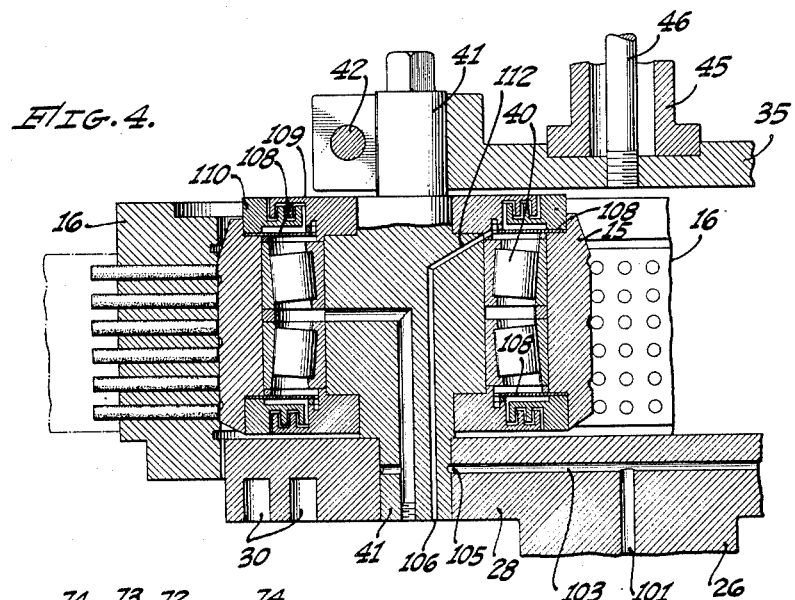
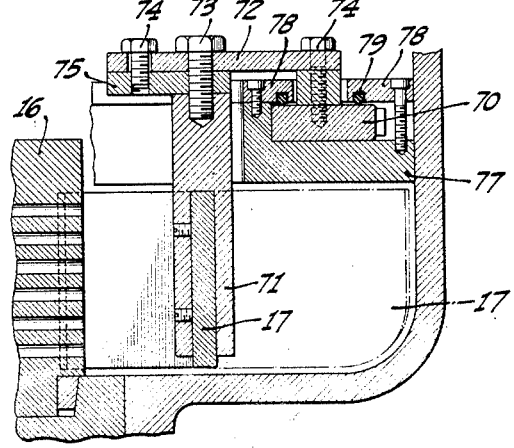

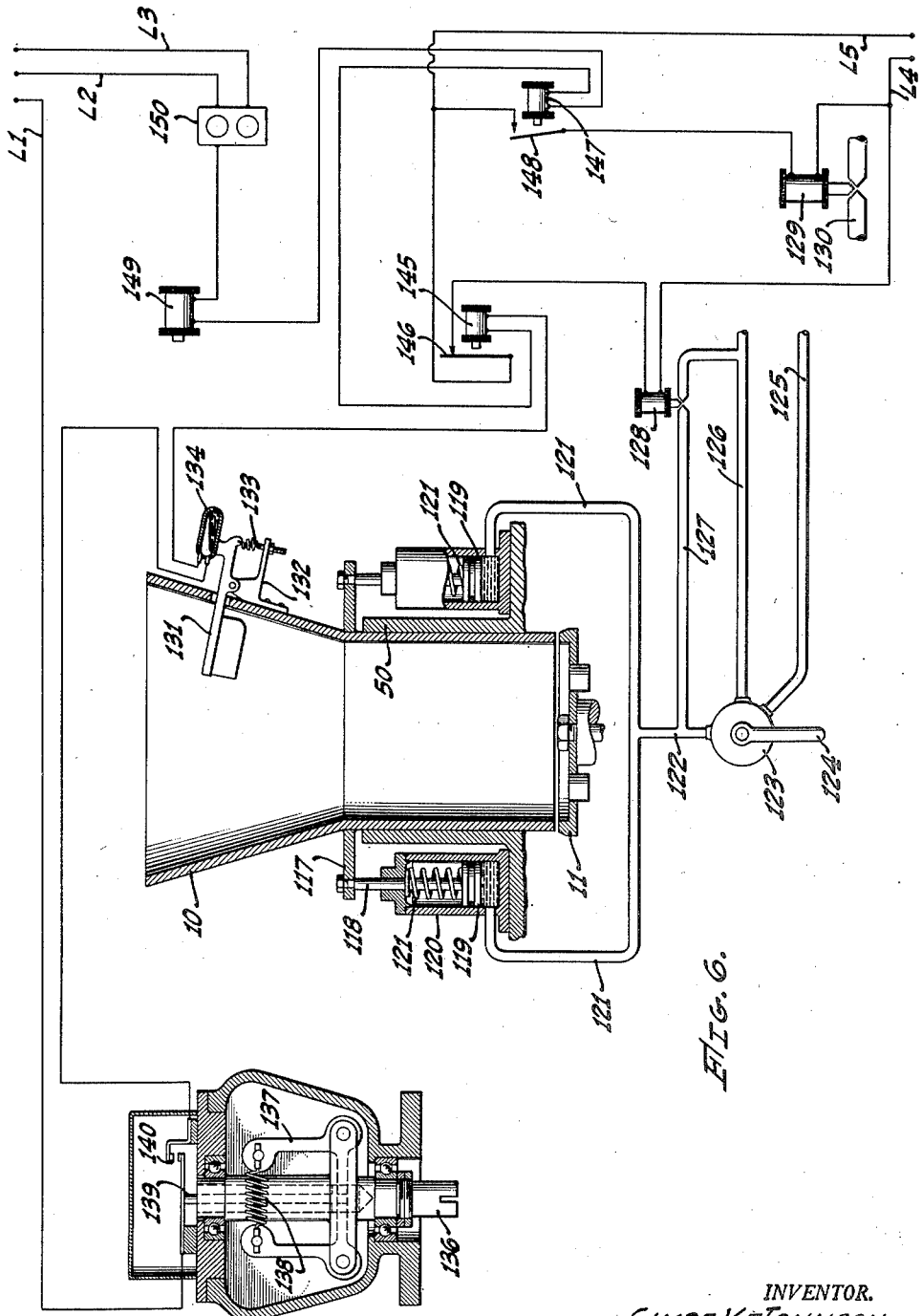

United States Patent Office 2,700,940
Patented Feb. 1, 1955

2,700,940

APPARATUS FOR PREPARING MOLDABLE MATERIALS AND PRODUCING PELLETS

Clyde V. Johnson, Los Angeles, Calif.

Application April 2, 1948, Serial No. 18,598

10 Claims. (Cl. 107—8)

This invention relates to apparatus for preparing moldable materials and for producing pellets, noodles and the like from the prepared moldable materials.

The apparatus of the present invention will be described in connection with the preparation of moldable material from loose stock feed of the type to be fed to poultry, dogs and the like, and the production of pellets, noodles and the like from the prepared moldable stock material, but the invention is not intended to be limited by reference to this particular kind of material since the apparatus of the present invention lends itself to the preparation and production of other types of material with equal facility.

It is a main object of the present invention to increase the output per horsepower of present pellet making machines by providing improved methods and apparatus for successfully conditioning all kinds of feed to produce a moldable mass of feed which takes less energy per pound to extrude and which does not evade the extruding rollers but may be easily prepared into extruding orifices.

Feed stock material contains a certain amount of natural oil and when this oil is brought to the surface of the particles of feed as by subjecting the stock material to heat such as by the application of steam a rather thick cohesive moldable mass is produced that can be easily extruded, the oil acting as a lubricant when masses of feed are pressed through the orifices. Masses of feed which are merely warm, wet with steam and in which hardly any oil is brought to the surface tend to foul up pellet machines by sliding before and evading the rollers and forming a sort of wedge and resisting entering the extruding orifices. On the other hand, moldable masses of feed in which the natural oil is properly brought to the surface of the particles of feed and which masses contain a minimum amount of moisture do not form wedges and slide before the rollers as do the wet noncohesive masses, and therefore these cohesive masses containing oil can readily be pressed into the extruding orifices and through the extruding orifices.

Prior devices having conditioning chambers for preparing moldable masses of feed have been defective in two ways, one that in the conditioning chamber, because of defective agitation and steam spraying part, of the feed travels through the conditioner with little chance of contacting the steam and so only a part of the total feed traveling through the conditioner was exposed to the steam so that the natural oil could be brought out only in that part exposed, and secondly that part exposed was only partially exposed so that not as much of the natural oil was brought out as is desirable. It was necessary in these prior devices in order to make them work as best as possible that the conditioning process be rather slow in order to bring out as much of the oil as possible therefore limiting the temperatures of the steam so as not to destroy the consumptive qualities of the feed and therefore the comparatively long period of time of contact to the steam and particles resulted in condensation of the steam, wetting the feed and resulting in erratic operation of the pellet machine.

The improved apparatus of the present invention for conditioning the feed stock provides a specially constructed agitation means for agitating the feed which agitation means operates in conjunction with specially constructed and arranged feed spraying means so that each particle of feed is completely exposed to the steam in order that more oil is brought to the surface of the particles so that each particle of feed is treated uniformly whereby the natural oil is brought to the surface of all the particles uniformly and because each particle is completely exposed the natural oil is brought out faster allowing the feed to be fed through the conditioner faster, hence allowing a higher temperature steam to be used in the conditioner resulting in less condensation and wetting of the moldable masses. The higher temperature of the steam will not harm the consumptive qualities of the feed since the feed is subjected to this higher temperature only for a short period of time. Some prior devices having feed conditioners have employed steam nozzles in the feed conditioners but these nozzles were aimed in the general direction of travel of the feed so that the steam spray or jet did not enter into the agitation process or if entering into the agitation process only in a very minor and accidental way and in these conditioners the steam was not distributed throughout the conditioner. In the present invention it is contemplated that the steam nozzles will be aimed angularly inwardly in he conditioning chamber or angularly backwardly, that is, in a direction opposed to the direction of rotation of the agitating blades, or the nozzles may be aimed angularly and backwardly. In any of the above arrangements of the steam nozzles the result is more contact with the feed, breaking clumps of the feed apart, scattering the feed and the steam so that the steam is distributed more uniformly in the conditioning chamber where there is more chance of uniform treatment of the feed. The steam nozzles of the present invention are so directed that the steam sprays or jets are more uniformly distributed in the conditioning chamber but are also so directed as to agitate the feed and when contacting the feed, scattering the steam still more uniformly throughout the conditioning chamber.

It will be seen then that the more successfully that the natural oil can be brought out the less the extruding machine tends to crush, disintegrate, or powder the feed material, crushing or powdering of the feed manifestly requiring more energy per bag of feed than in the case where the feed is merely compacted. The object in pellet forming machine is not to crush or powder the feed material but merely to form pellets with the least amount of energy per pellet and to produce pellets which when formed can be mixed, handled, packed and so forth without crumbling or breaking apart.

Another object of the present invention is to increase the capacity of the feed conditioner without increasing its size and the specially constructed agitation means of the present invention, in addition to cooperating with the the above named operations also serves to positively drive steam supplying means of the present invention to perform the moldable mass of feed into the extruding chamber, this, of course, increasing the amount of feed flowing through the conditioner and hence increasing the capacity of the conditioner and since the feed is more readily extruded a pellet machine may extrude more of the material with less energy than is taken with prior conditioned masses of feed material thereby increasing the output from the machine. Since the operation of the conditioner results in more quickly bringing out the natural oil the agitation means does not drive unprepared feed into the extruding means.

Another main object of the present invention is to provide an improved pellet machine which can extrude pellets from moldable material faster than heretofore possible and with less wear and depreciation.

Another object of this invention is to provide a control system for a pellet machine which control system is so arranged and constructed that it automatically stops various parts of the machine or the whole machine on the occurrence of certain events, thereby making it possible not only to save wear or possible destruction of parts or the whole machine but also to use cheaper labor to operate a machine and so to the purchaser of a machine a cheaper machine.

Another object of this invention is to so construct the machine that the inner working parts may be examined or repaired easily and quickly by providing a main cover part which is easily removable as a unit and preferably is counterweighted so that no special tools or hoists or the like are required for the inspection operations thereby cutting down on inspection and repair time and the expense of special machinery and tools.

In prior devices having an orificed die and extruding rollers none, to my knowledge, have devised a proper means for lubricating the rollers especially in those devices in which the rollers are bodily moved with respect to the orificed die. It is another object of this invention to provide a lubrication system for lubricating a machine which system is adapted to successfully lubricate not only rotating rollers which do not bodily move but also rotating rollers which do bodily move, which lubrication system in the preferred form of the invention provides for circulating lubrication of the bodily moving rollers at all times whether the machine is operating or not. This lubricating system serves not only to lubricate the rollers but also to cool the rollers by reason of the circulating lubricant so that the speed of pellet machines may be increased without danger of overheating the rollers thereby cutting down on wear and depreciation of the machine.

In pellet machines, various devices and systems have been utilized in an attempt to extract nails, bolts, and metal particles of all kinds which somehow find their way into the loose stock feed but to my knowledge no system has been used which positions magnets in a valve member which is positioned below the feed hopper as is done in the present invention which method proves highly satisfactory in extracting metal particles which have escaped extraction at previous points.

In prior machines having an orificed ring die and bodily movable rotating rollers moving about the inner face of an orificed die no simple construction has been devised which enables the rollers to be quickly and easily removed. In the present invention the rollers are mounted between a lower disc plate and a specially constructed upper plate so that the rollers may be easily repaired and inspected by merely removing the upper plate and the upper plate is so shaped and designed that it does not obstruct the moldable masses of feed which flow from the conditioning chamber into the extruding chamber.

With the foregoing and other objects in view, which will be made manifest in the following detailed description and specifically pointed out in the appended claims, reference is had to the accompanying drawings for an illustrative embodiment of the invention, wherein:

Fig. 2 is a sectional view along lines 2—2 of Fig. 1;

Fig. 3 is a sectional view along lines 3—3 of Fig. 1;

Fig. 4 is an enlarged sectional view along lines 4—4 of Fig. 2;

Fig. 5 is an enlarged sectional view along lines 5—5 of Fig. 2; and

Fig. 6 is a schematic diagram of the control system of the present invention.

Figure 1:
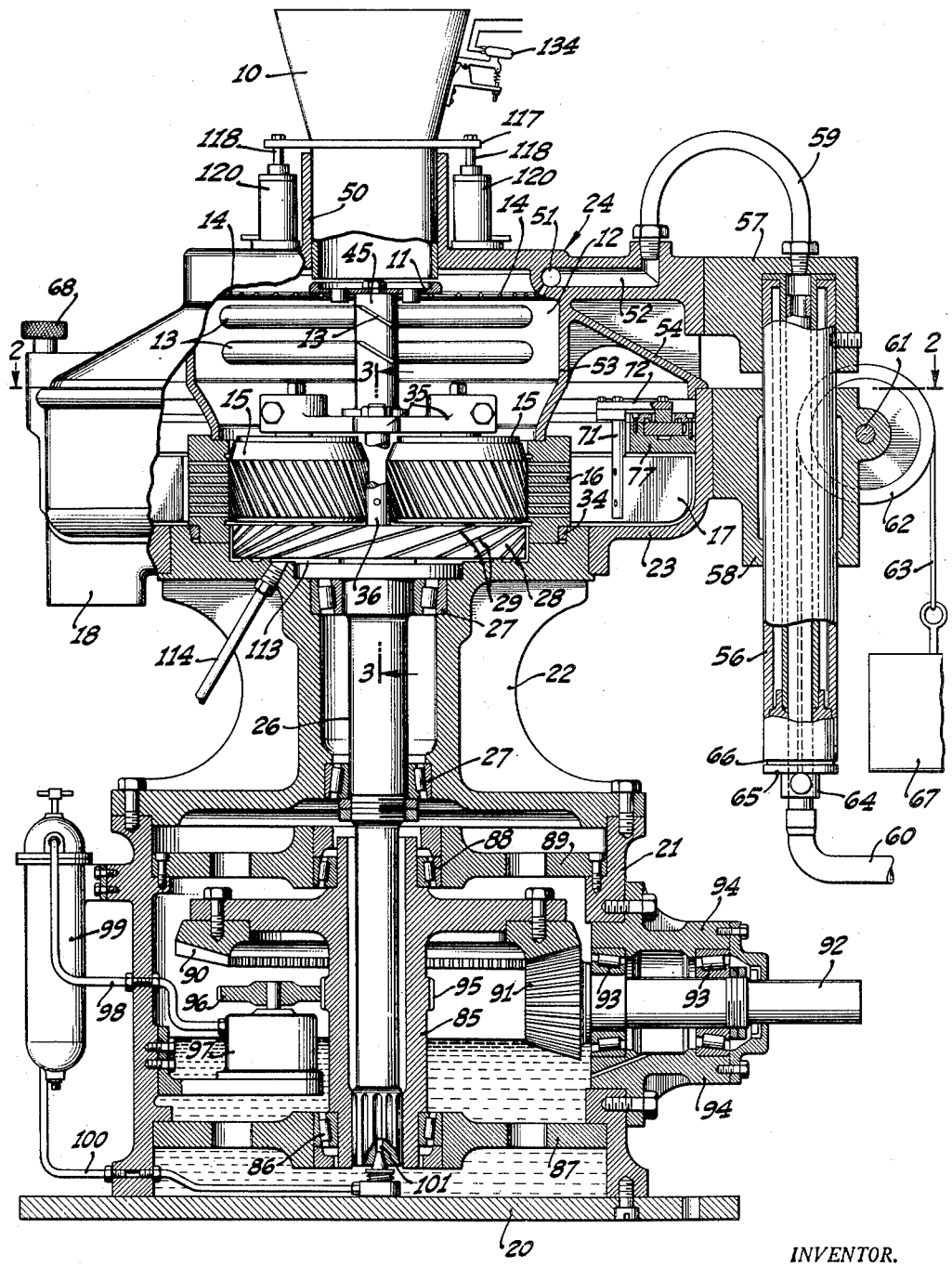
Fig. 1 shows a side elevation view of the pellet machine of the present invention with parts of the machine broken away.

A short description of the operation of the pellet forming machine shown in the drawings will be described so that the subsequent specific description will be more easily understood. Dry loose feed material is poured into a feeding hopper 10, the material passing down through the feeding hopper and onto a rotating shrouded valve plate 11 where the feed is thrown out by centrifugal force into a conditioning chamber 12 and onto rotating conditioner blades 13 and the feed mixes with steam issuing forth from steam nozzles 14 which direct the steam into the conditioning chamber. The conditioning blades 13 mix the loose feed with the incoming steam drawing out the oil in the feed and forming a cohesive moldable mass which is forced downwardly due to its own weight but more particularly due to the angularity of the conditioner blades into the extruding device comprising rotating rollers 15 which are rotated about the inner face of an orificed ring die 16. Counter-rotating knives or cutters 17 are moved about the outer face of orificed ring die 16 and contact and cut or knock off the issuing extruded material into pellets and these pellets are swept around by the cutters or knives 17 into an outlet hopper 18 where they are collected.

For the specific description, reference will be made to the accompanying drawings wherein similar reference characters designate similar parts throughout, and the machine of the preferred form of the invention has a main frame comprising a base plate 20 on which is mounted a gear casing 21, an upper base member 22, an extruding casing 23, and a conditioner casing 24, all of these parts being suitably connected together by means of nuts and bolts or other suitable fastening means.

The upper base 22 supports a main shaft 26 by means of bearings 27 both bearings resting against shoulders in upper base 22, as shown in Fig. 1. The main shaft 26 has a disc shaped head plate 28 preferably formed integrally therewith, said head plate having spiral grooves formed on the outer peripheral surface thereof and labyrinth passages 30 formed therein, as shown in Fig. 3. The spiral grooves serve to prevent moldable material from being forced down into the space between the head plate and the upper base 22. Head 28 is positioned within a counter-sunk portion of base 22, said base member having labyrinth passages 31 formed therein which cooperate with labyrinth passages 30 to keep oil from moving out and up into the extruding chamber. Orificed ring die 16 as positioned on upper base 22 and fastened in place by means of bolts 33 and gasketed by gasket 34, said orificed ring die having extruding orifices extending from its inner face to its outer face.

An upper plate 35 preferably having a cross shape is fixed in spaced relation with respect to head plate 28 by means of posts 36 which are threaded into head plate 28 and are fastened to upper plate 35 at the opposite ends of one leg of plate 35 by means of nuts 37. Rollers 15 are rotatably mounted by means of bearings 40 on shafts 41, as shown in Fig. 4, said shafts having the lower portions thereof reduced and fitting within holes provided in head plate 28, and the upper portions of shafts 21 are also reduced and fit within openings provided within the opposite ends of the other leg of upper member 35, the extremities of said leg being split and the bifurcated ends of each split end being connected together by means of bolts 42 and nuts 43, as shown in Fig. 2. The center line through the upper and lower portions of shaft 41 is eccentric with the center line through the middle portion of shaft 41 about which roller 15 rotates so that by loosening bolts 42 and nuts 43 the rollers may be properly adjusted with respect the inner face of ring die 16 which adjustment should preferably position the rollers so that they barely contact the ring die.

A hollow spindle 45 is fixedly mounted on upper plate 35 in a counter-sunk portion thereof, as shown in Fig. 4, by means of a central threaded rod 46 which passes through a central opening in the shrouded valve plate 11 and threads into the upper plate 35 thereby pressing the shrouded valve plate against the top of the hollow spindle and fastening the hollow spindle to the upper plate 35 so that both the valve plate and the spindle are fixed with relation to the upper plate 35. Hollow spindle 45 has two sets of blades fastened to the spindle at approximately 90° points thereabout and the blades are so threaded as to drive material within the conditioning chamber 12 down toward the rollers 15 and ring die 16.

Feeding hopper 10 is of funnel shape and slidably mounted within an upstanding collar 50 provided on conditioner casing 24, as shown in Fig. 1, and is moved up and down within the collar 50 by hydraulic means to be described hereinafter, the up and down movement increasing or decreasing the distance between the feeding hopper and the valve plate 11 thereby regulating the amount of feed flowing into the conditioner chamber 12. Conditioner casing 24 has an annular passage 51 preferably formed in the upper portion thereof and steam nozzles 14 extend therefrom into conditioning chamber 12 and steam is supplied to annular opening 51 by means of a steam passage 52 formed in conditioner casing 24. Conditioner casing 24 has an inner chamber forming web 53 which provides conditioner chamber 12 for the device, and the lower portion of web 53 bears against a countersunk portion of ring die 16, as seen in Fig. 1. A second web 54 is provided by conditioner casing 24 and extends outwardly from web 53 and is so formed as to bear against the upper portion of extruding chamber casing 23, as shown in Fig. 1, so as to completely enclose the top of the pellet machine in cover-like fashion.

Steam nozzles 14 are shown in the drawings as leading into conditioning chamber at an angle and this construction in conjunction with the angularly tilted blades 13 combine to so agitate the feed stock as to break up clumps of the feed and expose each particle of the feed stock to the steam so as to heat each particle completely, and all particles uniformly so as to bring out the desired amount of natural oil quickly to obtain a rather thick cohesive moldable mass containing a minimum amount of moisture so that when forced into the extruding chamber the mass readily submits to the rolling action of the rollers and is readily pressed through the extruding orifices where it is easily pressed through. I have observed that different types of feed required different types of settings of the angularity of the steam nozzles to obtain maximum results so that where a producer of pellets handles different types of feed, adjustable nozzles can be provided so that the steam spray or jet may be set at the proper angle to get maximum results for a particular feed. Other types of feeds "snowball," that is, instead of forming a cohesive moldable mass, form balls of feed which foul up the conditioner and resist extruding in the extruding chamber. By adjusting the steam nozzles so that they spray steam downwardly but backwardly, that is, in a direction opposed to the rotation of the conditioner blades 13, "snowballing" of feeds is eliminated. Sometimes in order to get maximum results with a particular type of feed it is desirable to not only adjust the nozzles so that they spray steam counter to the direction of the conditioner blades but also inwardly at an angle thereby producing a counter-directed cone of steam. In other instances it may be desirable to have alternate nozzles at one angle backwardly and/or inwardly and adjacent nozzles at different angles backwardly and/or inwardly or alternate nozzles straight down and/or backwardly and adjacent nozzles inwardly or backwardly. Since it is contemplated that the nozzles may be adjustable, all these various arrangements may be obtained or machines may be furnished with fixed nozzles at any angle desired.

In the drawings the conditioner casing 24 is shown as if it were cast in one piece although it may be formed of a number of different pieces of castings, forgings or the like, welded, connected or fastened together by any suitable means, it being important that whatever method used or however many parts the conditioner casing is formed from that the conditioner casing when fully assembled be removable as a unit from the machine so that whenever it is desired to inspect or repair the inner working parts of the machine including the blades 13, rollers 15, ring die 16, cutters 17, or the parts driving the cutters, that it is only necessary to remove one unit which unit is removable as if it were a single piece and this construction saves time and eliminates the necessity of special tools, hoists or other machines necessary to inspect and repair the pellet making machine.

In the preferred form of the invention the conditioner casing 24 is pivoted eccentric to the main vertical axis of the pellet machine by means of a pivot bar 56 which is fastened to an adapter member 57 which adapter member is fastened to conditioner casing 24. Pivot bar 56 is slidably and pivotally mounted within a lower adapter 58 which is fastened to the side of extruding chamber casing 23. A steam line 59 leads from steam passage 52 and is connected to the top of pivot bar 56, the pivot bar having a central steam passage therethrough leading outwardly from the bottom thereof to a telescopic steam adapter 60 so that it will be seen that when the conditioner casing 24 is moved upwardly and swung around that there will be no interference by the steam line so that no operations have to be performed on the steam line when it is desired to inspect the inner parts of the pellet making machine. Lower adapter 58 has an apertured boss formed therein through which a shaft 61 is rotatably mounted, said shaft having pulleys 62 fixedly mounted thereon, said pulleys having ropes or wires 63 passing thereover, one pair of ends of the ropes or wires being fastened to the ends of a cross bar 64, the center portion of which cross bar has the steam line passing therethrough and which is fastened on the lower end of a sleeve 65 which bears against a thrust bearing 66 provided within bar 56. The other ends of ropes or wires 65 are fastened to counterweight 67 which is designed to counterbalance the weight of the conditioner casing 24 and all of the other parts mounted thereon.

The extruding chamber casing 23 has bosses formed on the outer periphery thereof which have threaded holes therein so that thumb screws 68 which pass through openings in conditioner casing 24 may thread in the threaded holes provided in the bosses in extruding chamber casing 23 to secure the conditioner casing 24 down on the top of ring die 16 in extruding chamber 23.

The conditioning casing is easily removed by merely unscrewing the two screws, raising the conditioner casing, at the same time partially separating the telescoped steam adapter 60, the casing being raised until the lower portions of the web 53 clear the shrouded valve plate 11 whereby the conditioner casing 24 is swung or pivoted about the bar 56 and out from the machine so that the machine may be readily inspected and repaired quickly and easily. Under these conditions the conditioner casing will still be counterbalanced by the weights, and the ropes and wires will not become fouled up because the sleeve 65 merely remains stationary and the thrust bearing rotates.

Knives or cutters 17 are fixedly mounted upon a ring gear 70, see Fig. 5, by means of bifurcated rods 71 which have the cutters 17 passing therethrough and fastened thereto, the upper ends of rods 71 being fastened to adjusting plates 72 by means of bolts 73, said adjusting plates being fastened by bolts 74 to ring gear 70. The adjusting plates 72 have curved slots therein through which bolts 74 pass, said bolts threading into pivot plates 75 are fixedly mounted to bifurcated rods 71. The cutters 17 pivot about bolts 73 whenever bolts 74 are loosened so that by loosening bolts 74 and moving pieces 75 around within the curved slots in adjusting plate 72 the cutters may be positioned at any desired angle. Ring gear 70 rides within a bearing 77 which is fixedly mounted on extruding chamber casing 23, as shown in Fig. 5, said bearing having an inner upturned annular lip thereon and the inner face of said lip bears lightly against the inner face of gear ring 70. Ring gear closures 78 are fastened to bearing 77 and are gasketed at 79 so as to bear on ring gear 70, the gaskets preventing any oil which may be within the bearing 77 from escaping therefrom.

Although this is one type of cutter that can be used with the pellet machine, another type of cutter can be used which type has a symmetrical forward edge with the thickness of the cutter or blade preferably approximately half or less than half the diameter of the extruding orifices and the means for adjusting the cutters are manipulated so that the cutters or blades are arranged radial to the outer face of the ring die; therefore when the rollers are opposite the cutters and pressing moldable feed through the orifices none of the orificed holes will be blocked by the cutters so that there is no crowding of the feed within the orifices or strain on the cutters or rollers by being pushed outwardly or inwardly as now occurs when the cutters cover the extruding orifices which happen to be opposite the rollers.

Means are provided for driving ring gear 70 and therefore driving cutters 17 around the outer surface of ring die 16 and comprises a large spur gear 80 and a small spur gear 81, said small spur gear being mounted on or connected to the rotor of a secondary driving motor which is independent from the main motor of the apparatus, the secondary motor not being shown in the drawings. The secondary motor and the gears are enclosed by casing 82, see Fig. 2, which is fastened by means of bolts 83 or other suitable means to extruding casing 23, said extruding casing having an opening therein so that gear 80 may be positioned therethrough and properly meshed with ring gear 70. The secondary motor is so wired that when energized it rotates in a direction such as to move the cutters 17 in a direction opposed to the direction of rotation of rollers 15 so that the knives or cutters 17 can be said to be counter-rotated with respect to rollers 15. Means for driving the main shaft 26 are housed within casing 21 and drive the main shaft through the lower end thereof which is splined into a hollow gear mounting member 85, said member having the lower end thereof supported by bearing 86 which is supported by an apertured plate 87 and the upper end of member 85 is supported by a bearing 88 which supported by an apertured plate 89, both of the plates being fixedly fastened to casing 21. Member 85 has a bevel gear 90 fastened thereto or integrally formed therewith and meshes with a bevel gear 91 which is fixedly mounted on a drive shaft 92, said drive shaft being driven by the main motor of the pellet machine, not shown. Drive shaft 92 is supported by bearings 93 within an oiling casing 94 which is fixedly mounted on casing 21. Member 85 has a spur gear 95 fastened therearound or formed integrally therewith which gear meshes with spur gear 96 so as to drive an oil pump 97, said oil pump supplying oil by means of feed line 98 to a filter 99, said pump taking up oil from an oil sump provided in the bottom of casing 21. An oil feed line 100 leads from filter 99 through casing 21 to the bottom of main shaft 26, said shaft being provided with a central oiling passage 101 which extends through the length thereof up to and partially through head plate 28 where there are two horizontal branch off lines 102 and 103. Horizontal branch off line 102 leads outwardly from shaft 26, see Fig. 3, to a point above upper bearing 27, the oil from this line being confined to downward travel by means of an oil seal 104 so that the oil passing through line 102 flows through bearing 27, through bearing 88, down over gears 90, 91 and 96, and into the oil sump where the pump collects the oil and pumps it through again and back through the system. The other horizontal oil feed line 103 leading out from shaft 26 is located above oil feed line 102, and oil feed line 103 leads to shafts 41, see Fig. 4, where it meets annular feed lines 105 provided in the lower reduced portions of shaft 41, there being inwardly leading passages from the annular feed lines into a central passage 106 which leads upwardly into shafts 41 and outwardly into bearings 40, as seen in Fig. 4. There are oil sealing means 108 provided for rollers 15 to prevent the oil from escaping from the rollers and mixing with the feed and there are outside labyrinth pieces 109 and inside labyrinth pieces 110 provided in the top and bottom of each roller 15 to form labyrinth passages to prevent the feed or mash or moldable material from forcing its way down into the bearings. An oil passageway 112 leads from the top of each bearing down through the shafts 41 into a space 113, see Fig. 3, said space being provided between head plate 28 and the upper face of upper base 22, where the oil is prevented from flowing down through the central passage around shaft 26 by the oil seal 104. An exit feed line 114 leads from the space 113 back into the oil sump provided in casing 21. The feed line 112 is smaller than feed line 106 so that an oil pressure is built up within the system so that all the parts are properly lubricated. Rollers in prior devices have been heated up by their continuous operation and the oil system of the present invention by providing a circulating lubricating system absorbs the heat from the rollers and conveys it to the oil sump where the heat will be dissipated. If desired a cooling system may be provided for cooling the oil. As before mentioned, there is a hydraulic system for raising and lowering the feeding hopper 10 and this system comprises a yoke 117 which is fastened to the feeding hopper 10 and to the ends of piston rods 118 which have pistons 119 fastened and formed integrally with the ends thereof, said pistons being contained within cylinders 120 which are fixedly mounted on the top of conditioning casing 24, see Fig. 6. There are compression springs 121 surrounding the piston rods 118 and tending to force the piston rods downwardly toward the conditioning casing 24 so that the springs always tend to close the feeding hopper against the shrouded valve 11 and therefore shut off the feed from the conditioner chamber 12. Hydraulic lines 121 lead from cylinders 120 to a central hydraulic line 122 which leads to a control valve 123, said control valve being equipped with a pivoting handle 124 for controlling the supply of fluid to the cylinders 120. Hydraulic inlet line 125 supplies hydraulic fluid under pressure to valve 123 and hydraulic line 126 conveys hydraulic fluid away from valve 123 and back to a hydraulic pump, not shown. There is a bypass hydraulic feed line 127 which connects the central feed line 122 to outlet line 126, said bypass line being opened and closed by solenoid cutout 128, said solenoid being spring constrained to close the hydraulic line 127 at all times when the solenoid is not energized. A control system is provided for the apparatus of the present invention so that the different parts of the system will be interlocked with one another so that on the occurrence of specified events various parts of the entire apparatus will close themselves down automatically, and also so that the machine can not be started without feed in the feed hopper or without the pellet knives rotating. This control system is disclosed diagrammatically in Fig. 6 in which a steam cutout solenoid 129 is shown as being in position to open and close the steam line 130 which steam line supplies steam to the conditioning chamber 12, said solenoid being spring constrained to close the steam line whenever the solenoid is not energized. The control system comprises an upper circuit including a main motor switch, a centrifugal control connected to or mounted on the secondary motor and a feeding hopper switch control, and two control solenoids; and the control system includes a lower circuit including steam cutout solenoid 129 and hydraulic cutout 127 and the switch not shown for energizing the secondary motor.

The feeding hopper control of the control system comprises a pivotal gauge member 131 which is mounted on the outside of feeding hopper 10 by means of a bracket 132 which is fastened to the feeding hopper 10, said bracket having a tension spring 133 and adjustably fastened to bracket 132, said tension spring normally tending to tilt the opposite end of gauge 131 in an upward direction. The tension spring is made adjustable so that the initial adjustments of the system may be made and also that the said hopper control can be adjusted for different types of feed. A mercury switch 134 is mounted on the outer end of gauge 131 so that when the gauge member is tilted downwardly the mercury will flow to the left hand end of the mercury container and close the mercury switch which is located in the upper circuit. When feed is passing through the feeding hopper 10, the inside end of the gauge will be pressed downwardly thereby closing the mercury switch in the upper circuit but whenever the feed is exhausted within the feeding hopper the tension spring 133 will tilt the gauge upwardly thereby breaking the upper circuit. The centrifugal switch control comprises a shaft 136 which is connected to or mounted on the rotor of the secondary motor and has mounted thereon a centrifugal switching device comprising bell cranks 137, tension spring 138, vertically moving shaft 139 and switch 140 which is preferably a micro switch. When shaft 136 is rotated at a predetermined speed the bell cranks 137 will both tilt outwardly against the face of tension springs 138 to a position such as to raise the vertical shaft 139 and close the contacts of switch 140 which contacts being in the upper circuit also break the upper circuit when the contacts are parted so it will be seen that when the feeding hopper mercury switch and the switch 140 are closed the upper circuit can be energized by depressing the main motor switch 150. The upper circuit comprises lines L1, L2 and L3, line L1 leading through switch 140, through mercury switch 134, through relay 145 which controls switch 146, said switch being biased to closed position, then through a relay 147 which controls a switch 148 which switch is biased to open position and line L1 then leads through a master relay 149 to starting switch 150 to line L2, and also to another switch within the main starting switch 150 which is not shown which leads to line L3. Line L1 and line L3 lead to the main motor and lines L1, L2 and L3 are connected to a source of current.

The control system functions somewhat as follows. If the main motor switch 150 is depressed before the secondary motor switch, not shown, is depressed, neither the upper circuit or lower circuit will be energized because the energization of the lower circuit is controlled by the secondary motor switch and since the upper circuit is broken by mercury switch 134 and switch 140 it can not be energized. If the secondary motor switch is closed and assuming that there is no feed in the hopper, the lower circuit will be energized and since switch 146 is biased to closed position solenoid 128 will be energized opening the hydraulic line 127 but since switch 148 is biased to open position and since relay 147 is not energized the steam cutout 129 will remain in closed position so that no steam is supplied to the conditioning chamber 12; the main motor will not start because the mercury switch 134 is open. However, under these conditions, if feed is introduced into the feed hopper so as to depress lever 131 to close the mercury switch 134, and since switch 140 is closed by operation of the secondary motor, the main switch 150 may be depressed to start the main motor and at the same time, since the upper circuit is energized, relays 145 and 147 are energized, relay 145 when energized breaking switch 146 deenergizing solenoid 128 so that the hydraulic line 127, which is the bypass hydraulic line, is closed permitting the feeding hopper to be raised by manipulation of the valve handle 124 and feed allowed to flow into the conditioner, and since relay 147 is also energized, switch 148 is closed energizing solenoid 129 opening the steam line 130 so that steam is allowed to flow into the steam chamber 12.

When main starting switch 150 is depressed, relay 149 is energized which controls the other switch within main switch 150 which is closed and the main motor is energized through lines L1 and L3 so that it does not matter when pressure is released on the starter button because the circuit will remain energized until the stop button is broken.

If at any time during the operation of the machine the secondary motor is stopped or slowed down for any reason whatsoever the bell cranks 137 will move inwardly opening the switch 140 which breaks the upper circuit deenergizing relays 145 and 147 the deenergization of relay 145 resulting in the energization of relay 128 which opens the hydraulic cutout line 127 which bypasses the hydraulic fluid to the outlet line 126 closing the feeding hopper 10 under the influence of springs 121, and the deenergizing of relay 147 opens switch 148, deenergizing relay 129 thereby closing steam cutout line 130 thereby cutting off steam from the conditioner chamber. Or, if during operation of the machine there is a stoppage of the feed flow or the feed in the feeding hopper is exhausted the gauge 131 will tilt upwardly and mercury switch 134 will open breaking the upper circuit which will deenergize relays 145 and 147 with the result described in the above sentence.

It will be seen then that by the present invention an improved method and apparatus is provided for conditioning feed in a faster and easier manner than heretofore possible and that a pellet machine is provided which can handle the feed and increase the output over ordinary pellet machines and by means of the lubrication system and the control system, the pellet machine of the present invention will not wear or depreciate as much as slower speed pellet machines and that in the event an unexpected event occurs the pellet machine will automatically turn itself off resulting in less wear and breakage of parts.

Magnets 151 which may either be electro magnets or permanent magnets are provided in the bottom of shrouded valve plate 11 and these magnets serve to attract and extract metal particles from the loose feed which flows down through the feed hopper 10. To my knowledge no pellet machine has been devised which positions magnets in a valve member which is positioned below the feed hopper as is here done which method proves highly satisfactory in extracting metal particles which have escaped extraction at previous points. These metal particles if allowed to fall into the extruding chamber damage the rollers and orificed die and the cutters and so it is very important that all of the metal particles be removed.

Since there is a separate motor for driving the cutters for cutting off pellets, the speed of the cutters may be regulated independent of the speed of the extruding rollers so that any different size pellet may be readily obtained.

The methods and apparatus of the present invention also find particular utility in preparing and extruding feed material containing molasses or glucose. Molasses or glucose or like material is added to the feed to increase the protein value of the feed and also to make feed sweeter since some types of animals such as rabbits like the pellets better when they are sweet. Although desirable, the inclusion of molasses or glucose or like material in the feed has heretofore had certain disadvantages in that when prepared in prior conditioners the feed was wet by being left in contact with steam too long and also heated to an extent such that the molasses became very sticky and the feed instead of forming a cohesive mass formed a sticky, gummy, gooey mass which is very difficult to extrude. In the present invention with the introduction of dry steam in the conditioner in the manner set forth hereinbefore and in which the feed is quickly prepared so that the feed does not become wet nor is heated too long, feed containing molasses may be prepared and extruded by the present apparatus without the difficulties found in prior devices. As an example, feed containing up to 25% molasses has been prepared and extruded in machines embodying the present invention without a material reduction in output of bag per horsepower as has occurred in prior machines. The reference to 25% of molasses is not intended to be a limitation but only as an example of what the present machine can accomplish.

Various changes may be made in the details of construction without departing from the spirit and scope of the invention as defined by the appended claims.

I claim:

1. In a pellet forming machine, extruding means, means defining a conditioning chamber thereover through which material to be extruded passes towards the extruding means, means for injecting steam into the conditioning chamber to enter the material passing therethrough, and means mounting the conditioning chamber defining means on the extruding means for lateral swinging movement relatively thereto whereby the conditioning chamber defining means may be swung laterally with respect to the extruding means to permit of inspection or repair of the extruding means, said means including a steam connection coaxially arranged with the mounting means through which steam is supplied to the steam injecting means.

2. In a pellet forming machine, extruding means, means defining a conditioning chamber thereover through which material to be extruded passes towards the extruding means, means for injecting steam into the conditioning chamber to enter the material passing therethrough, and means mounting the conditioning chamber defining means on the extruding means for vertical and lateral swinging movement relatively thereto whereby the conditioning chamber defining means may be lifted and swung laterally with respect to the extruding means to permit of inspection or repair of the extruding means, said means including a telescopic steam connection coaxially arranged with the mounting means through which steam is supplied to the steam injecting means.

3. In a pellet forming machine, material extruding means, means defining a conditioning chamber thereover through which material to be extruded passes toward the extruding means, means for injecting steam into the material as it passes through the conditioning chamber to the extruding means, means providing an axially slidable and pivotal connection between the conditioning chamber defining means and the extruding means arranged laterally with respect to the conditioning chamber and the extruding means whereby the conditioning chamber providing means may be lifted and swung laterally relatively to the extruding means, and means for supplying steam to the steam injecting means including a pivotal and axially slidable connection arranged coaxially with the first-mentioned pivotal connection.

4. In a pellet forming machine, material extruding means, means defining a conditioning chamber thereover through which material to be extruded passes toward the extruding means, means for injecting steam into the material as it passes through the conditioning chamber to the extruding means, means providing an axially slidable and pivotal connection between the conditioning chamber defining means and the extruding means arranged laterally with respect to the conditioning chamber and the extruding means whereby the conditioning chamber providing means may be lifted and swung laterally relatively to the extruding means, means for supplying steam to the steam injecting means including a pivotal and axially slidable connection arranged coaxially to the first-mentioned pivotal connection, and counterbalance means arranged to counterbalance the weight of the conditioning chamber defining means.

5. In a pellet machine, a horizontally disposed die ring, supporting means therefor, a vertical shaft extending therethrough, rollers mounted for rotation on the vertical shaft arranged to roll against the interior of the die ring and extrude material therethrough, blades on the shaft above the rollers, means defining a conditioning chamber over the die ring and about the blades, and means providing an axially slidable and pivotal connection between the conditioning chamber defining means and the supporting means for the die ring whereby the conditioning chamber defining means may be elevated to clear the blades on the top of the shaft and then swung laterally to expose the interior of the die ring.

6. In a pellet machine, a horizontally disposed die ring, supporting means therefor, a vertical shaft extending therethrough, rollers mounted for rotation on the vertical shaft arranged to roll against the interior of the die ring and extrude material therethrough, blades on the shaft above the rollers, means defining a conditioning chamber over the die ring and about the blades, and means providing an axially slidable and pivotal connection between the conditioning chamber defining means and the supporting means for the die ring whereby the conditioning chamber defining means may be elevated to clear the blades on the top of the shaft and then swung laterally to expose the interior of the die ring, steam injecting means on the conditioning chamber defining means, and means for supplying steam thereto including a telescopic joint arranged coaxially with said axially slidable and pivotal connection.

7. In a pellet machine having a die ring, extruding rollers rollable against the interior thereof, pellet cutters operable about the exterior thereof, means defining a conditioning chamber over the die ring, a feeding mouth for introducing material into the conditioning chamber, a motor for driving the cutters, a second motor for driving the rollers, means connecting the second motor to the first motor so that the second motor cannot be energized until after the first motor is energized, means for introducing steam into the conditioning chamber, means for cutting off the supply of steam to the conditioning chamber, means connecting the steam cut-off means to the first motor so as to cut off steam from the conditioning chamber whenever the first motor is not running, feeding mouth closing means, and means connecting the feeding mouth closing means to the first motor so as to close the feeding mouth whenever the first motor is not running.

8. In a pellet forming machine, extruding means, a conditioning chamber through which material to be extruded passes toward the extruding means, means for injecting steam into the conditioning chamber, a feed hopper leading into the conditioning chamber, and means in the feed hopper for closing off the supply of steam to the conditioning chamber whenever material is not being fed into the conditioning chamber through the feed hopper.

9. In a pellet machine, a die ring, a shaft extending therethrough, rollers on the shaft for extruding material through the die ring, a conditioning chamber above the die ring, a feed hopper leading into the conditioning chamber, a valve plate on the shaft adjacent the outlet from the feed hopper, means for raising and lowering the feed hopper relatively to the valve plate, means for injecting steam into the material in the conditioning chamber, and means for lowering the feed hopper toward the valve plate and shutting off the supply of steam to the conditioning chamber whenever material is not being fed through the feed hopper to the conditioning chamber.

10. In a pellet machine, a horizontal die ring, a vertical shaft extending therethrough, rollers rotatably mounted on the shaft engageable with the die ring to extrude material therethrough, knives rotatable against the exterior of the die ring, means for driving the knives independently of the shaft, a conditioning chamber over the die ring, a feed hopper leading into the conditioning chamber, a valve plate on the shaft adjacent the outlet from the feed hopper, means for injecting steam into the conditioning chamber, means for raising and lowering the feed hopper relatively to the valve plate, and means for lowering the feed hopper toward the valve plate and shutting off the supply of steam to the conditioning chamber whenever the knives are not being rotated.

References Cited in the file of this patent

UNITED STATES PATENTS

| Number | Name | Date |
|---|---|---|
| 462,322 | Moffatt et al. | Nov. 3, 1891 |
| 800,370 | Green | Sept. 26, 1905 |
| 832,823 | Wait | Oct. 9, 1906 |
| 1,127,925 | Schueler | Feb. 9, 1915 |
| 1,700,510 | Oches | Jan. 29, 1929 |
| 1,744,591 | Taurel | Jan. 21, 1930 |
| 1,790,347 | Hawkins | Jan. 27, 1931 |
| 1,936,377 | Candor | Nov. 21, 1933 |
| 1,954,086 | Meakin | Apr. 10, 1934 |
| 1,994,371 | Sizer | Mar. 12, 1935 |
| 2,020,510 | Meakin | Nov. 12, 1935 |
| 2,044,376 | Webster | June 16, 1936 |
| 2,054,782 | Day | Sept. 15, 1936 |
| 2,075,450 | Meakin | Mar. 30, 1937 |
| 2,240,660 | Meakin | May 6, 1941 |
| 2,241,546 | Evenstad et al. | May 13, 1941 |
| 2,467,722 | Baker | Apr. 19, 1949 |